United States Patent

Hamano et al.

[11] Patent Number: 5,478,286
[45] Date of Patent: Dec. 26, 1995

[54] SYNCHRONOUS BELT

[75] Inventors: Naoki Hamano; Tomoko Hamano; Tsutomu Shioyama, all of Kobe, Japan

[73] Assignee: Bando Chemical Industries, Ltd., Kobe, Japan

[21] Appl. No.: 371,129

[22] Filed: Jan. 11, 1995

[30] Foreign Application Priority Data

Jan. 13, 1994 [JP] Japan ................................. 6-001861

[51] Int. Cl.$^6$ ........................................... F16G 1/28
[52] U.S. Cl. ........................ 474/205; 474/260; 474/271
[58] Field of Search ............................... 474/205, 260, 474/268, 271

[56] References Cited

U.S. PATENT DOCUMENTS

| | | | |
|---|---|---|---|
| 5,051,299 | 9/1991 | Brown | 428/221 |
| 5,310,386 | 5/1994 | Mizuno et al. | 474/205 |
| 5,314,741 | 5/1994 | Roberts et al. | 428/215 |
| 5,387,664 | 2/1995 | Kawasaki et al. | 525/336 |
| 5,391,627 | 2/1995 | Araki et al. | 474/202 X |

FOREIGN PATENT DOCUMENTS

| | | |
|---|---|---|
| 0461865 | 12/1991 | European Pat. Off. . |
| 4234149 | 4/1993 | Germany . |
| 60-172749 | 9/1985 | Japan . |
| 63-159454 | 7/1988 | Japan . |
| 1087937 | 4/1989 | Japan . |
| 5156086 | 5/1993 | Japan . |
| 564252 | 9/1993 | Japan . |

*Primary Examiner*—Roger J. Schoeppel
*Attorney, Agent, or Firm*—Sixbey, Friedman, Leedom & Ferguson; Gerald J. Ferguson, Jr.

[57] ABSTRACT

There is provided a synchronous belt with excellent heat resistance and excellent abrasion resistance, in which a backing rubber is composed of a rubber composition obtained by vulcanizing hydrogenated nitrile rubber with an organic peroxide. At least the lowermost layer of a tooth rubber is composed of a hydrogenated nitrile rubber composition obtained through both sulfur vulcanization and peroxide vulcanization. The coating rubber on a facing fabric is composed of a rubber composition obtained through sulfur vulcanization. The above rubber composition of the tooth rubber is obtained by adding, to every 100 g of hydrogenated nitrile rubber, 0.3 to 10 g of sulfur-containing vulcanizing agent and 0.002 to 0.025 mol of organic peroxide.

6 Claims, 1 Drawing Sheet

SYNCHRONOUS BELT

BACKGROUND OF THE INVENTION

The present invention relates to a synchronous belt for use as a timing belt in an automotive engine or the like.

Conventionally, synchronous belts have been manufactured of chloroprene rubber. However, as the demand on miniaturized automotive engine rooms increases, a higher heat resistance has been required of synchronous belts.

As disclosed in Japanese Laid-Open Patent No. 60-172749, there has been known a synchronous belt in which a hydrogenated nitrile rubber composition obtained through sulfur vulcanization is used for the backing rubber, the tooth rubber, and the coating rubber on a facing fabric attached to the tooth rubber, so as to provide a higher heat resistance.

There has also been proposed a synchronous belt, as disclosed in Japanese Laid-Open Patent No. 1-87937 or the like, in which a rubber composition obtained through peroxide vulcanization with an organic peroxide serving as a vulcanizing agent is used for the backing rubber and the tooth rubber, while a hydrogenated nitrile rubber composition obtained through sulfur vulcanization is used for the coating rubber on the facing fabric.

However, the former synchronous belt in which the backing rubber is composed of the hydrogenated nitrile rubber composition obtained through sulfur vulcanization is still unsatisfactory in terms of heat resistance. To provide sufficient heat resistance, it can be considered to constitute each of the backing rubber, the tooth rubber, and the coating rubber on the facing fabric by the hydrogenated nitrile rubber composition. In this case, however, the above coating rubber cannot provide sufficiently strong adhesion between the facing fabric and the tooth rubber, resulting in early peeling off and breaking of the facing fabric.

To solve the above problem, the latter synchronous belt uses the hydrogenated nitrile rubber composition obtained through peroxide vulcanization in the backing rubber and in the tooth rubber, while using the rubber composition obtained through sulfur vulcanization in the coating rubber. However, since different vulcanizing agents are used in subjecting the synchronous belt to a molding/vulcanizing process under pressure, the sulfur in the coating rubber shifts toward the tooth rubber, while the organic peroxide in the tooth rubber shifts toward the coating rubber, so that a vulcanization density (crosslinking density) is easily reduced. As a result, the amount of the coating rubber abraded from the facing fabric becomes significant, which is limiting the extension of the durable life of the synchronous belt.

SUMMARY OF THE INVENTION

An object of the present invention is to provide a synchronous belt with excellent heat resistance, excellent peeling resistance, and excellent abrasion resistance, while providing enhanced adhesion between the facing fabric and the tooth rubber.

To attain the above object, the synchronous belt of the present invention comprises a backing rubber, a cord, a tooth rubber, and a facing fabric coated with rubber, which are sequentially stacked downward so as to form a multilayer structure, wherein the above tooth rubber is composed of a hydrogenated nitrile rubber composition having a hydrogen addition rate of 80% or more (the rate of double bonds to which hydrogen is added and saturated to all the double bonds in rubber) which was obtained through both sulfur vulcanization with sulfur or a sulfur-containing compound and peroxide vulcanization with an organic peroxide and the coating rubber on the above facing fabric is composed of a rubber composition obtained through sulfur vulcanization with sulfur or a sulfur-containing compound.

In the present invention, sulfur vulcanization and peroxide vulcanization of the tooth rubber contributes to enhanced strength and other mechanical properties of the belt. Of the two types of vulcanization, the peroxide vulcanization contributes to enhanced mechanical properties of the belt by conferring a desired elasticity to the belt. On the other hand, the above sulfur vulcanization contributes to enhanced adhesion of the facing fabric, while preventing sulfur or a sulfur-containing compound contained in the coating rubber on the facing fabric as its vulcanizing agent from shifting toward the tooth rubber, thereby contributing to enhanced abrasion resistance of the belt.

That is, since each of the tooth rubber and facing fabric was obtained through sulfur vulcanization, the peeling resistance of the facing fabric is increased. Moreover, since vulcanizing agents of the same type are used for the tooth rubber and the coating rubber on the facing fabric, the vulcanizing agent for the coating rubber on the facing fabric is prevented from shifting toward the tooth rubber, so that a desired vulcanization density can be obtained, while the amount of the coating rubber abraded from the facing fabric and the degree of damage thereto are reduced.

Thus, according to the present invention, the tooth rubber and coating rubber exhibit high elasticity, while preventing the facing fabric from peeling off. Moreover, the abrasion of the coating rubber from the facing fabric is decreased, so that the durable life of the synchronous belt is increased.

<Hydrogenated Nitrile Rubber>

The hydrogenated nitrile rubber (H-NBR) serving as the base of the above tooth rubber was obtained by adding hydrogen to double bonds in nitrile rubber. The addition of hydrogen prevents the occurrence of decomposition or breakage due to oxidation which may cause heat aging of rubber (reduction in elasticity of rubber). Consequently, heat resistance of the nitrile rubber is enhanced, while oil resistance of the nitrile rubber is advantageously retained. For this purpose, the present invention uses a hydrogenated nitrile rubber having a hydrogen addition rate of 80% or more.

If the hydrogen addition rate of the hydrogenated nitrile rubber is less than 80%, the resulting synchronous belt exhibits reduced heat resistance. In view of the foregoing, it is preferable to use a hydrogenated nitrile rubber having a hydrogen addition rate of 90% to 98% for the tooth rubber and to use a hydrogenated nitrile rubber having a hydrogen addition rate of 85% to 95% for the coating rubber on the facing fabric.

The same is true in the case where a hydrogenated nitrile rubber composition is used for the backing rubber and for the coating rubber on the facing fabric.

<Structure of Tooth rubber>

To attain the object of the present invention, the above tooth rubber is preferably formed into a multi-layer structure consisting of two or more rubber layers so that the lowermost layer is composed of a hydrogenated nitrile rubber composition having a hydrogen addition rate of 80% or more, which was obtained through both sulfur vulcanization with sulfur or a sulfur-containing compound and peroxide vulcanization with an organic peroxide.

Although the thickness of the lowermost layer of the above tooth rubber is not particularly limited, preferably the lowermost layer has a thickness of 0.4 mm or more so as to surely exert the above effects.

<Backing Rubber>

Although the backing rubber can be composed of various rubber compositions, a hydrogenated nitrile rubber composition is particularly preferred.

To improve the mechanical properties of the resulting synchronous belt, the above backing rubber is more preferably composed of a hydrogenated nitrile rubber composition having a hydrogen addition rate of 80% or more, which was obtained through vulcanization with an organic peroxide.

If the backing rubber is composed of such a rubber composition, the resulting belt is imparted with a desired elasticity so that its mechanical properties are improved. Moreover, the resulting belt is also imparted with enhanced heat resistance. In view of the foregoing, a hydrogenated nitrile rubber having a hydrogen addition rate of 95% or more is more preferably used for the above backing rubber.

<Rubber Composition Composing Whole or Lowermost Layer of Backing Rubber>

To attain the object of the present invention more successfully, the rubber composition composing the above tooth rubber which was obtained through both sulfur vulcanization and peroxide vulcanization is more preferably a hydrogenated nitrile rubber composition obtained by adding, to every 100 g of hydrogenated nitrile rubber having a hydrogen addition rate of 90% to 98%, 0.3 to 10 g of sulfur and 0.002 to 0.025 mol of organic peroxide as vulcanizing agents.

In the tooth rubber or in the rubber of its lowermost layer, the amount of an organic peroxide to be added to every 100 g of hydrogenated nitrile rubber has been set to 0.002 to 0.025 mol since, if the amount is less than 0.002 mol, a sufficient vulcanizing reaction cannot be obtained. The resulting belt becomes low in elasticity, shorter in life under constant load, and unsuitable for practical use. If the amount surpasses 0.025 mol, on the other hand, the resulting belt becomes excessively high in elasticity so that its elongation is reduced, resulting in a shorter flex life. In view of the foregoing, the amount of the above organic peroxide to be added to every 100 g of hydrogenated nitrile rubber is more preferably set to 0.005 to 0.015 mol.

The amount of sulfur to be added to every 100 g of hydrogenated nitrile rubber has been set to 0.3 to 10 g since, if the amount is less than 0.3 g, the sulfur contained in the coating rubber is allowed to shift toward the above tooth rubber so that the abrasion resistance of the coating rubber is reduced. If the amount surpasses 10 g, on the other hand, the sulfur tends to interrupt peroxide vulcanization in the tooth rubber. The resulting belt becomes low in elasticity, shorter in life under constant load, and unsuitable for practical use. In view of the foregoing, the amount of sulfur is more preferably set to 0.5 to 1.5 g.

<Organic-Peroxide Vulcanizing Agent>

The organic-peroxide vulcanizing agent used in the above peroxide vulcanization is not particularly limited. For example, there can be used dicumyl peroxide, 2,5-dimethyl-2,5-di(t-buthyl peroxy) hexane, 2,5-dimethyl-2,5-di(t-buthyl peroxy) hexyne-3, benzoyl peroxide, 2,4-dichlorodibenzoyl peroxide, cumene hydroperoxide, t-buthyl peroxybenzoate, 2,5-dimethyl-2,5-di(benzoyl peroxy) hexane, or the like.

<Sulfur Vulcanizing Agent>

In the above sulfur vulcanization, sulfur or a sulfur-containing vulcanizing agent can be used. The sulfur-containing vulcanizing agent is not particularly limited. For example, there can be used 4,4'-dithio-bis-morpholine, tetra methylthiurammonosulfide, tetramethylthiuramdisulfide, 2-(4'-morpholinodithio) benzothiazole, or the like.

<Coating Rubber on Facing Fabric>

The coating rubber on the facing fabric was obtained by coating the facing fabric with a rubber cement prepared by dissolving an unvulcanized rubber composition in a proper organic solvent. It is also possible to add, to the coating rubber, an additive required to compose a so-called HRH composition. To compose the HRH composition, silica, a methylene acceptor, and a methylene donor are typically used. For these methylene acceptor and methylene donor, any materials that have conventionally been known as such can be used. The representatives of the methylene acceptor are resorcinol and its derivatives. The representatives of the methylene donor are hexamethylenetetramine, hexamethoxymethylmelamine, and their derivatives.

The typical composition of the coating rubber in the case where the above HRH composition is added thereto is: 0.5 to 2.5 parts by weight of sulfur vulcanizing agent; 5 to 20 parts by weight of silica; 1 to 15 parts by weight of methylene acceptor; and 1 to 15 parts by weight of methylene donor for every 100 parts by weight of hydrogenated nitrile rubber. As an organic solvent, toluene or methyl ethyl ketone is preferably used. Although the organic solvent is normally used in the range of 600 to 900 parts by weight for every 100 parts by weight of rubber composition, the amount is not particularly limited. The amount of the organic solvent is determined so that the viscosity of the resulting adhesive composition is optimized. If the amount of the organic solvent is excessively small, the resulting rubber cement becomes excessively high in viscosity, resulting in poor operability. If the amount of the organic solvent is excessively large, on the other hand, the resulting rubber cement becomes excessively low in viscosity. As a result, when a coating process is performed with respect to the facing fabric, the amount of the rubber cement attached to the facing fabric becomes small, so that sufficiently strong adhesion cannot be provided between the facing fabric and tooth rubber.

<Hydrogenated Nitrile Rubber Composition>

The unvulcanized rubber composition containing hydrogenated nitrile rubber as its base which is applicable to the above backing rubber, tooth rubber, and coating rubber is normally kneaded by a roll, an internal mixer, or the like used in the rubber industry. If desired, various agents as well as the above ingredients can be added to the unvulcanized rubber composition. Examples of such agents are: a reinforcing agent such as carbon black or silica; a filler such as calcium carbonate or talc; a co-vulcanizing agent such as triallyl isocyanurate, trimethylolpropane triacrylate, or phenylene-bismaleimide; a vulcanization accelerator; a vulcanization aid; an activator; a softener; a plasticizer; a stabilizer; and a processing aid.

<Facing Fabric, etc.>

The facing fabric of the present invention is made of nylon fibers, aramid fibers, or the like. The cord is made of glass fibers, aramid fibers..I carbon fibers, or the like. However, the materials of the facing fabric and of the cord are not limited thereto.

<Method of Manufacturing Synchronous Belt>

The synchronous belt according to the present invention can be manufactured in a typical method that has conventionally been known. That is, the facing fabric coated with rubber and then dried is wound up around a cogged mold shaped in accordance with the indentation of the belt, on and around which a cord, an unvulcanized rubber sheet which will serve as the tooth rubber, and an unvulcanized rubber sheet which will serve as the backing rubber are wound up. After being subjected to the molding/vulcanizing process under pressure in a vulcanizer, the winding is cut crosswise, resulting in a synchronous belt.

In coating the above facing fabric with rubber, the facing fabric is preferably immersed in the above rubber cement with low viscosity which contains an increased amount of solvent, pulled out of the rubber cement, and then dried. After that, a rubber cement with higher viscosity which contains a reduced amount of solvent is applied onto one side (closer to the tooth rubber) or both sides of the facing fabric.

Figure 1:
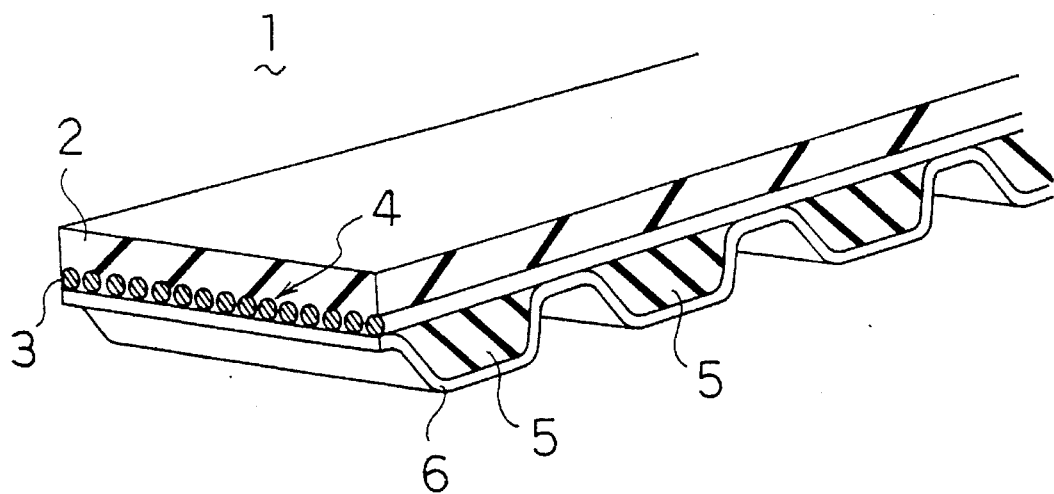
FIG. 1 is a partial perspective view of a synchronous belt which is partially shown in cross section.

Each of the tooth rubber 5 of the synchronous belt 1 in FIG. 1 and the lower layer 8b of the tooth rubber 8 of the tooth belt 7 is composed of the hydrogenated nitrile rubber composition obtained by adding, to every 100 g of hydrogenated nitrile rubber, 0.3 to 10 g of sulfur-containing vulcanizing agent and 0.002 to 0.025 mol of organic peroxide.

Below, Table 1 shows the respective compositions of the hydrogenated nitrile rubber compositions A and C obtained through peroxide vulcanization used in the examples of the present invention and in the comparative example, the hydrogenated nitrile rubber composition B obtained through sulfur vulcanization, and hydrogenated nitrile rubber compositions D to I obtained through both sulfur vulcanization and peroxide vulcanization (compositions of unvulcanized rubber compositions).

TABLE 1

|  | A | B | C | D | E | F | G | H | I |
|---|---|---|---|---|---|---|---|---|---|
| NITRILE HYDRIDE RUBBER[1] | 100 | — | — | — | — | — | — | — | — |
| NITRILE HYDRIDE RUBBER[2] | — | — | 100 | 100 | 100 | 100 | 100 | 100 | 100 |
| NITRILE HYDRIDE RUBBER[3] | — | 100 | — | — | — | — | — | — | — |
| CARBON BLACK | 50 | 50 | 50 | 50 | 50 | 50 | 50 | 50 | 50 |
| PLASTICIZER | 10 | 10 | 10 | 10 | 10 | 10 | 10 | 10 | 10 |
| ZINC OXIDE | 5 | 5 | 5 | 5 | 5 | 5 | 5 | 5 | 5 |
| STEARIC ACID | 1 | 1 | 1 | 1 | 1 | 1 | 1 | 1 | 1 |
| ANTIOXIDANT | 1 | 1 | 1 | 1 | 1 | 1 | 1 | 1 | 1 |
| VULCANIZATION ACCELERATOR | — | 3 | 0.4 | 2 | 2 | 2 | 4 | 2 | 2 |
| SULFUR | — | 0.5 | — | 0.5 | 0.5 | 0.5 | 5 | 0.5 | 1.5 |
| DICUMYL PEROXIDE[4] | 2.7 | — | 2.7 | 0.27 | 2.7 | 6.5 | 2.7 | 0.54 | 2.7 |
| NUMBER OF MOLES OF PEROXIDE | 0.01 | — | 0.01 | 0.001 | 0.01 | 0.024 | 0.01 | 0.002 | 0.01 |

NOTES
[1]"Zetpol 2000" COMMERCIALLY AVAILABLE FROM Nippon Zeon Co., Ltd.
[2]"Zetpol 2010" COMMERCIALLY AVAILABLE FROM Nippon Zeon Co., Ltd.
[3]"Zetpol 2020" COMMERCIALLY AVAILABLE FROM Nippon Zeon Co., Ltd.
[4]"Park Mill" COMMERCIALLY AVAILABLE FROM Nippon Oil and Fats Co., Ltd.

Figure 2:
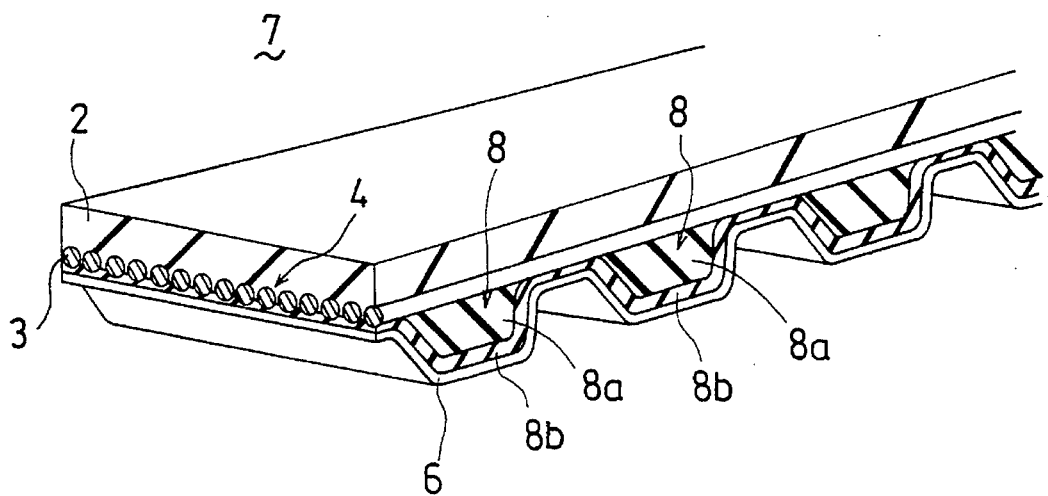
FIG. 2 shows another synchronous belt 7 having a tooth rubber 8 in two layers. In the tooth rubber 8, the upper layer 8a is composed of the hydrogenated nitrile rubber composition obtained through peroxide vulcanization, while the lower layer 8b is composed of the hydrogenated nitrile rubber composition obtained through both sulfur vulcanization and peroxide vulcanization.

FIG. 2 is a view similar to FIG. 1, which shows another example of the synchronous belt.

DETAILED DESCRIPTION OF THE PREFERRED EMBODIMENT

Below, a description will be given to the embodiment of the present invention.

As shown in FIG. 1, a synchronous belt 1 is composed of a multi-layer structure consisting of a backing rubber 2, a cord layer 4 in which a cord 3 is disposed, a tooth rubber 5, and a facing fabric 6, which are sequentially stacked downward.

The above backing rubber 2 is composed of a hydrogenated nitrile rubber composition obtained through peroxide vulcanization. The tooth rubber 5 is composed of a hydrogenated nitrile rubber composition obtained through both sulfur vulcanization and peroxide vulcanization. A coating rubber on the above facing fabric 6 is composed of a rubber composition obtained through sulfur vulcanization.

Each of the above unvalcanized rubber compositions was formed into a sheet with a thickness of 1 mm and pairs of sheets were bonded together by vulcanization in accordance with the combinations shown in the following Table 2, which also shows the physical properties of the vulcanized materials thereof.

TABLE 2

|  | EXAMPLES OF PRESENT INVENTION | | COMPARATIVE | REFERENCE EXAMPLES | | |
|---|---|---|---|---|---|---|
|  | 1 | 2 | EXAMPLE 1 | 1 | 2 | 3 |
| COMBINATION | A/E | B/E | A/B | A | B | E |
| ORDINARY STATE | | | | | | |
| HARDNESS (JIS-A) | 70 | 69 | 66 | 72 | 69 | 69 |
| 100% MODULUS (MPa) | 3.6 | 3.1 | 2.2 | 5.1 | 2.8 | 3.4 |
| TENSILE STRENGTH (Mpa) | 24.2 | 23.1 | 22.1 | 24.1 | 24.0 | 23.2 |
| ELONGATION (%) | 510 | 585 | 690 | 470 | 590 | 600 |
| AFTER HEAT AGING (HEATING AT 150° C. FOR 7 DAYS) | | | | | | |
| VARIATION IN HARDNESS | +11 | +12 | +12 | +10 | +12 | +12 |
| VARIATION IN 100% MODULUS | +104 | +311 | +370 | +120 | +400 | +172 |
| RATE OF CHANGE OF TENSILE STRENGTH (%) | −5 | −6 | −7 | +4 | −17 | −5 |
| RATE OF CHANGE OF ELONGATION (%) | −30 | −52 | −64 | −17 | −80 | −31 |
| TOLUENE IMMERSION TEST[3] | | | | | | |
| VOLUME CHANGE (%) | 107 | 102 | 175 | 100 | 95 | 112 |
| WEIGHT CHANGE (%) | 134 | 131 | 206 | 133 | 128 | 140 |
| ABRASION TESTING[4] ABRASION LOSS (mm$^3$) | 76 | 71 | 139 | 70 | 56 | 83 |
| PERMANENT COMPRESSION SET (AFTER HEATING AT 100° C. FOR 22 HRS.) | 17 | 28 | 57 | 15 | 32 | 21 |

NOTES
[3] VOLUME CHANGE AND WEIGHT CHANGE AFTER IMMERSION AT ROOM TEMERATURE FOR 7 DAYS
[4] ABRASION LOSS AFTER TRAVELLING 40 mm UNDER LOAD (kgf) WITH DIN ABRASION TESTER From the above Table 2, it will be appreciated that, compared with a single sheet composed of one vulcanized rubber material, a composite sheet of a rubber composition obtained through peroxide vulcanization and a rubber composition obtained through sulfur vulcanization which were bonded together by vulcanization as in the comparative example 1 presents large variations in volume and in weight after immersed in toluene as well as a large amount of abrasion in an abrasion test, so that the composite sheet is considerably inferior in terms of permanent compression set. By contrast, in the case where a rubber composition obtained through both sulfur vulcanization and peroxide vulcanization is used as in the examples 1 and 2 of the present invention (see the combination of A and E and the combination of B and E), the combination A/E shows the physical properties intermediate between those of the single sheets A and E of the vulcanized materials, while the combination B/E shows the physical properties intermediate between those of the single sheets B and E of the vulcanized materials, so that abrupt lowering of the physical properties is not observed in either case.

Next, synchronous belts were produced using the rubber compositions shown in Table 1 for the tooth rubber, for the backing rubber, and for the coating rubber on the facing fabric in accordance with the combinations shown in Table 3. In the process, the coating rubber was applied onto the facing fabric made of a nylon canvas to be dried. After that, the facing fabric coated with the rubber was wound up around a cogged mold shaped in accordance with the indentation of a belt to be produced, on and around which a glass cord which would serve as a cord, a sheet of unvulcanized rubber which would serve as the tooth rubber (or the upper-layer tooth rubber or lower-layer tooth rubber) composed of a specified rubber composition shown in Table 1, and a sheet of unvulcanized rubber which would serve as the backing rubber were wound up, vulcanized in a vulcanizer, and cut crosswise, thus producing a synchronous belt.

A load-resistant test and a travelling test with heat were performed using the synchronous belt, the results of which are shown in the following Table 3. In the travelling test with heat and load-resistant test performed in the comparative example 2, the facing fabric was peeled off the tooth rubber and broken at an early stage.

TABLE 3

|  | EXAMPLES OF PRESENT INVENTION | | | | | | COMPARATIVE EXAMPLES | | | | | |
|---|---|---|---|---|---|---|---|---|---|---|---|---|
|  | 3 | 4 | 5 | 6 | 7 | 8 | 2 | 3 | 4 | 5 | 6 | 7 |
| BACKING RUBBER | A | A | A | A | A | A | A | A | B | B | A | A |
| TOOTH RUBBER | E | F | G | H | A + E[1] | I | A | A | B | B | C | D |

TABLE 3-continued

| | EXAMPLES OF PRESENT INVENTION | | | | | | COMPARATIVE EXAMPLES | | | | | |
|---|---|---|---|---|---|---|---|---|---|---|---|---|
| | 3 | 4 | 5 | 6 | 7 | 8 | 2 | 3 | 4 | 5 | 6 | 7 |
| COATING RUBBER | B | B | B | B | B | B | A | B | B | C | B | B |
| TRAVELLING LIFE WITH HEAT (hrs.) | B.C.[2] 3000 OR MORE | B.C. 3000 OR MORE | B.C. 3000 OR MORE | B.C. 3000 OR MORE | B.C. 3000 OR MORE | B.C. 3000 OR MORE | P.C. 50 | B.C. 3000 OR MORE | B.C. 800 | B.C. 670 | B.C. 3000 OR MORE | B.C. 2930 |
| LOAD-RESISTANT LIFE | TOOTH BREAKAGE DUE TO ABRASION OF FACING FABRIC | | | | | | PEELING OF FACING FABRIC | TOOTH BREAKAGE DUE TO ABRASION OF FACING FABRIC | | | | |
| (hrs) | 550 | 410 | 360 | 320 | 530 | 570 | 20 | 170 | 180 | 155 | 200 | 243 |

NOTES
[1]COMBINATION OF A AND E IN WHICH E IS 0.4 mm THICK AND PLACED CLOSER TO FACING FABRIC
[2]BACK CRACKING
[3]PEELING OF FACING FABRIC

In the travelling test with heat, a belt under test with a width of 19 mm was wound up around a driving pulley and a driven pulley via an idler pulley, thus setting the number of revolutions of the driving pulley at 3000 rpm and the initial tension of the belt at 15 kgf. The belt was then allowed to travel at an ambient temperature of 130°±3° C. without load, so that the belt was evaluated from the period between the initiation of travelling and the generation of a crack in the backing rubber or tooth rubber (tooth root).

In the load-resistant test, a belt under test with a width of 10 mm was wound up around the driving pulley and the driven pulley, thus setting the number of revolutions of the driving pulley at 6000 rpm and the initial tension of the belt at 20 kgf. The belt was then allowed to travel at an ambient temperature of 100°±3° C. under the load of 4 PS, so that the belt was evaluated from the period between the initiation of travelling and the generation of a crack in the backing rubber or tooth rubber (tooth root).

We claim:

1. A synchronous belt comprising a backing rubber, a cord, a tooth rubber, and a facing fabric coated with rubber, which are sequentially stacked downward so as to form a multilayer structure, wherein said tooth rubber is composed of a hydrogenated nitrile rubber composition having a hydrogen addition rate of 80% or more which was obtained through both sulfur vulcanization with sulfur or a sulfur-containing compound and peroxide vulcanization with an organic peroxide-and the coating rubber on said facing fabric is composed of a rubber composition obtained through sulfur vulcanization with sulfur or a sulfur-containing compound.

2. A synchronous belt comprising a backing rubber, a cord, a tooth rubber, and a facing fabric coated with rubber, which are sequentially stacked downward so as to form a multilayer structure, wherein said tooth rubber consists of two or more rubber layers, the lowermost layer of said tooth rubber is composed of a hydrogenated nitrile rubber composition having a hydrogen addition rate of 80% or more which was obtained through both sulfur vulcanization with sulfur or a sulfur-containing compound and peroxide vulcanization with an organic peroxide, and the coating rubber on said facing fabric is composed of a rubber composition obtained through sulfur vulcanization with sulfur or a sulfur-containing compound.

3. A synchronous belt according to claim 1, wherein said backing rubber is composed of a hydrogenated nitrile rubber composition having a hydrogen addition rate of 80% or more which was obtained through vulcanization with an organic peroxide.

4. A synchronous belt according to claim 2, wherein said backing rubber and one or more upper layers except the lowermost layer of said tooth rubber is composed of a hydrogenated nitrile rubber composition having a hydrogen addition rate of 80% or more which was obtained through vulcanization with an organic peroxide.

5. A synchronous belt according to claim 1, 2, 3, or 4, wherein the rubber composition composing said tooth rubber which was obtained through both sulfur vulcanization and peroxide vulcanization is a hydrogenated nitrile rubber composition obtained by adding, to every 100 g of hydrogenated nitrile rubber having a hydrogen addition rate of 90% to 98%, 0.3 to 10 g of sulfur and 0.002 to 0.025 mol of organic peroxide, each serving as a vulcanizing agent.

6. A synchronous belt according to claim 1, 2, 3, or 4, wherein the rubber composition composing said tooth rubber which was obtained through both sulfur vulcanization and peroxide vulcanization is a hydrogenated nitrile rubber composition obtained by adding, to every 100 g of hydrogenated nitrile rubber having a hydrogen addition rate of 90% to 98%, 0.5 to 1.5 g of sulfur and 0.002 to 0.025 mol of organic peroxide, each serving as a vulcanizing agent.

* * * * *